(No Model.)

D. L. McCORKINDALE.
JOURNAL HEAD FOR ROLLS.

No. 527,708.  Patented Oct. 16, 1894.

WITNESSES:
Donn Twitchell
Theo. G. Hostings

INVENTOR
D. L. McCorkindale
BY Munn & Co.
ATTORNEYS.

UNITED STATES PATENT OFFICE.

DUNCAN L. McCORKINDALE, OF CHILDS, MARYLAND.

JOURNAL-HEAD FOR ROLLS.

SPECIFICATION forming part of Letters Patent No. 527,708, dated October 16, 1894.

Application filed April 10, 1894. Serial No. 507,012. (No model.)

*To all whom it may concern:*

Be it known that I, DUNCAN L. MCCORKINDALE, of Childs, in the county of Cecil and State of Maryland, have invented a new and Improved Journal-Head for Rolls, of which the following is a full, clear, and exact specification.

The invention relates to rolls, cylinders and the like used in paper making and other machines; and its object is to provide a new and improved journal head, which is simple and durable in construction, easily applied, and arranged to permit of conveniently removing and replacing the spindle in case of wear or breakage, and without removing the roll from the machine.

The invention consists of certain parts and details, and combinations of the same, as will be fully described hereinafter and then pointed out in the claims.

Reference is to be had to the accompanying drawings, forming a part of this specification, in which similar letters of reference indicate corresponding parts in all the figures.

Figure 1:
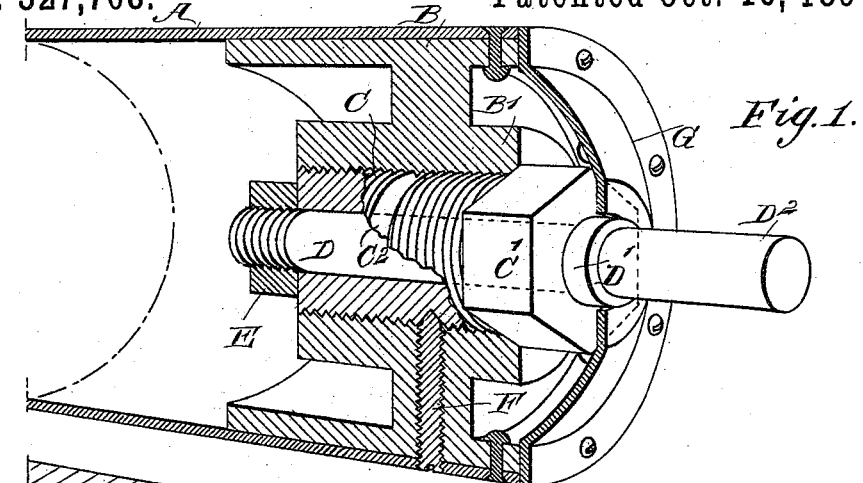
Figure 2:
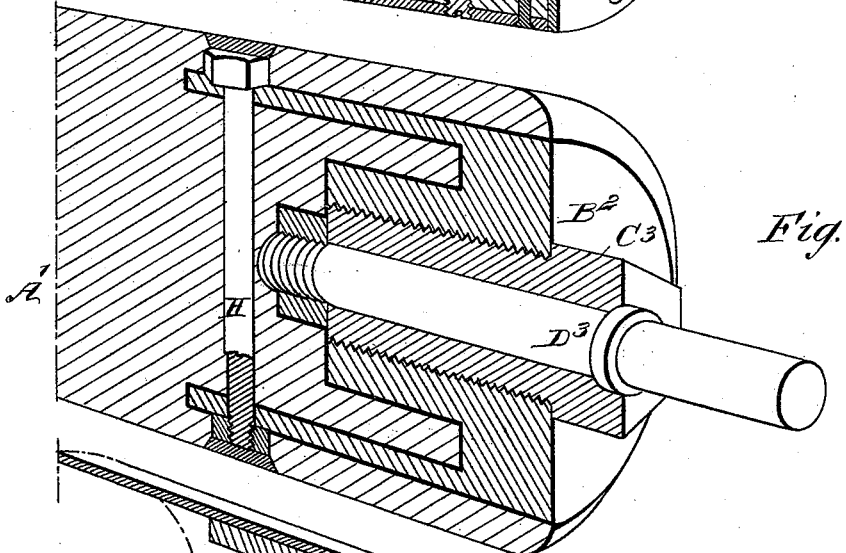
Figure 3:
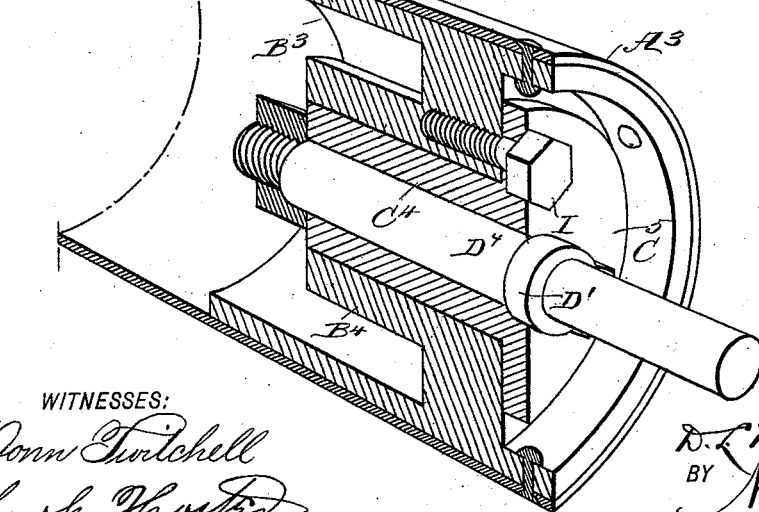

Figure 1 is a sectional perspective view of the improvement. Fig. 2 is a similar view of a modified form of the same; and Fig. 3 is a like view of another modified form of the improvement.

As shown in Fig. 1, the roll or cylinder A is made of metal, and is provided in one end with a head B, riveted or otherwise secured to the roll, and in the head B is formed the central hub B′, having an interior screw thread in which screws a bushing C, provided on its outer end with a polygonal head C′ to permit the operator to conveniently apply a wrench or other tool to screw the said bushing into or out of the threaded hub B′. The journal spindle D is carried by the bushing C and forms either an integral part thereof or is fastened thereto as shown, the spindle D being provided for this purpose with a collar D′, abutting against the outer end of the head C′, and from this collar D′ extends the journal D² proper, adapted to revolve in suitable bearings on the machine. The rear or inner end of the journal spindle D is screw threaded and projects beyond the inner end of the bushing, the said threaded portion of the spindle receiving a nut E, so as to securely fasten the spindle in place in the bushing. The latter is adapted to be fastened in place in the hub of the head B by a set screw F, screwing through the cylinder and head to engage, with its inner end, an annular groove C² formed in the peripheral surface of the bushing C.

It will be seen that the spindle D can be securely fastened in the bushing C and then the latter, with the spindle, screwed into the threaded hub B′ of the head B already fastened in the roll or cylinder A. When the bushing C is secured in place the set screw F is inserted and screwed up to lock the bushing in place in the hub B′. On the end of the roll or cylinder A may be placed a cap G for covering up the parts of the head, as indicated in Fig. 1.

As shown in Fig. 2, the roll A′ is made solid and formed in its end with a recess for the reception of the head B² carrying in its hub the bushing C³, in which is fastened the spindle D³. The head B², in this case, is fastened in place in the roll A′ by a bolt H, as shown in the said figure.

As illustrated in Fig. 3, the metallic roll or cylinder A³ carries in its end a head B³, having a hub B⁴ without the thread, and in which hub fits the bushing C⁴ having a flange C⁵ adapted to be secured by bolts I to the head B³, as is plainly shown in the drawings. In the bushing C⁴ is held the spindle D⁴, in the manner above described.

In order to remove a broken spindle or insert a new one, the operator first unscrews the bolts I and then pulls out the bushing from the head B³ to remove the broken spindle and insert a new one therein, and fasten the same in place by the nut on the inner end of the spindle, as above described. The bushing is then again inserted in the hub B⁴ and the bolts I screwed up to fasten the bushing in place.

It will be seen that this journal head for rolls can be readily applied, and permits of conveniently removing and replacing a journal spindle in case of wear or breakage of the same and without removing the roll from the machine.

Having thus fully described my invention, I claim as new and desire to secure by Letters Patent—

1. In a roll substantially as described, the combination of a cylindrical head located within the roll and having a bore, the bushing made in the form of a continuous unbroken annulus or ring and fitted and secured in the bore of the head, and having a bore extending from end to end, the journal having its shank portion fitted snugly both circumferentially and longitudinally to the bore of the bushing and extended at its inner end beyond the inner end of the bushing, and a fastening engaging the said extended inner end of the journal, substantially as and for the purposes set forth.

2. In a roll substantially as described, the head located within the roll and having a central bore, the bushing having a tubular portion made continuous and unbroken in a circumferential direction and formed exteriorly to fit in the bore of the head and provided at its outer end with a flange or collar to abut the head when the bushing is adjusted thereto, such bushing having a bore, and the journal having a portion fitting in the bore of the bushing, projecting at its inner end beyond the said bushing and secured substantially as described, and having at its outer end a collar bearing against the said bushing, substantially as set forth.

DUNCAN L. McCORKINDALE.

Witnesses:
WM. T. CAMPBELL,
CASPAR GARRETT.